J. R. BOARDMAN.
JOINT FOR SILOS, GRAIN BINS, AND STORAGE TANKS.
APPLICATION FILED OCT. 30, 1912.

1,084,531.

Patented Jan. 13, 1914.

WITNESSES

INVENTOR
J. R. Boardman

Attorneys.

UNITED STATES PATENT OFFICE.

JOHN R. BOARDMAN, OF OKLAHOMA, OKLAHOMA, ASSIGNOR TO THE BOARDMAN COMPANY, OF OKLAHOMA, OKLAHOMA.

JOINT FOR SILOS, GRAIN-BINS, AND STORAGE-TANKS.

1,084,531.   Specification of Letters Patent.   Patented Jan. 13, 1914.

Application filed October 30, 1912. Serial No. 728,634.

*To all whom it may concern:*

Be it known that I, JOHN R. BOARDMAN, citizen of the United States, residing at Oklahoma city, in the county of Oklahoma and State of Oklahoma, have invented certain new and useful Improvements in Joints for Silos, Grain-Bins, and Storage-Tanks, of which the following is a specification.

This invention relates to silos, and has particular reference to the joint or connection between meeting sections.

My invention relates especially to silos which may be shipped in knock-down condition and set up by unskilled persons, and has for its object the provision of a joint whereby leakage therethrough or access of air to the interior of the silo will be prevented.

The invention is illustrated in the accompanying drawings and will be hereinafter fully set forth.

Figure 1:
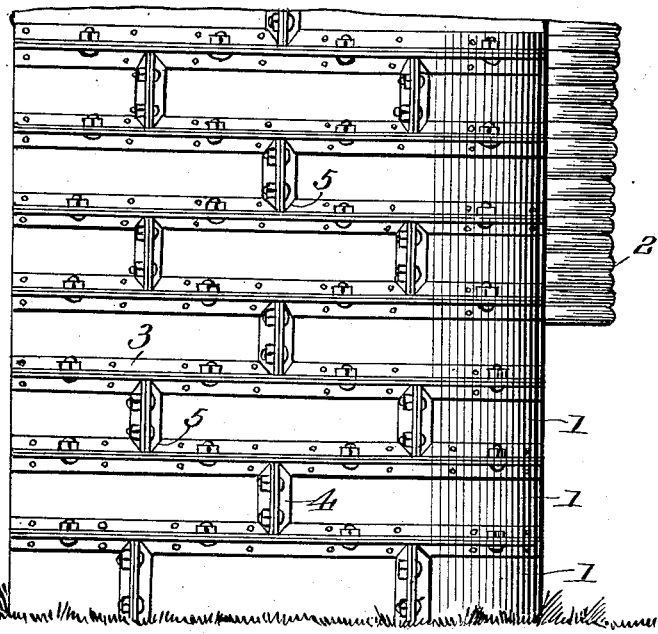
Figure 5:
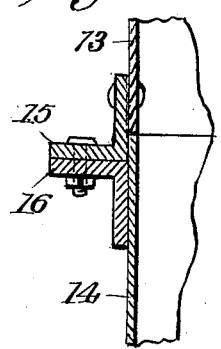
Figure 2:
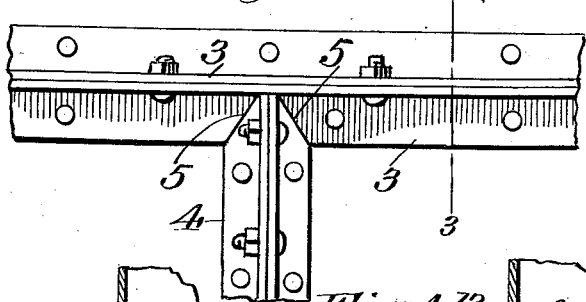
Figure 6:
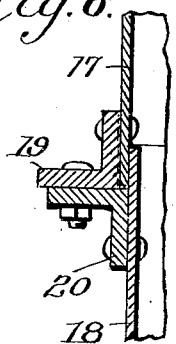
Figure 3:
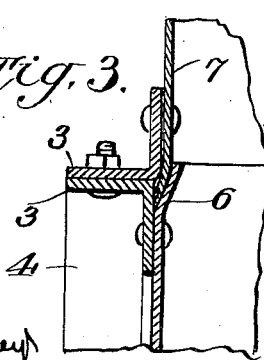
Figure 4:
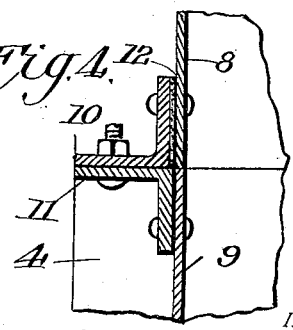

In the drawings: Figure 1 is an elevation of a portion of a silo embodying my invention; Fig. 2 is an enlarged elevation of a portion of one of the seams or joints; Fig. 3 is a section on a larger scale taken on the line 3—3 of Fig. 2; Fig. 4 is a similar view showing a slight modification. Figs. 5 and 6 are similar views showing further modifications.

In carrying out my invention, I construct the silo of a series of superposed metal rings, each of which is composed of sections or plates which may be semi-circular or may form a lesser segment of the circumference of the silo as may be preferred or may be determined by the diameter of the silo. In Fig. 1, I have shown a series of the superposed rings, indicated at 1, and have also shown a portion of a chute 2 on the side of the silo through which the fodder or other feed is discharged as it is removed from the silo for use, the loss of the feed, due to the same being blown about by high winds, being thereby prevented. The several sections of the several rings are reinforced by angle plates 3 which are securely bolted together when the rings are constructed at the factory and when they are superposed to form the silo, as will be readily understood. The angle plates 4 which are disposed at the ends of the sections of the rings are securely bolted together when the rings are made, but the angle plates at the upper and lower edges of the rings are, of course, not bolted together until the rings are superposed in building the silo. Where the horizontal and vertical angle plates meet, they will, of course, have their ends mitered, as indicated at 5, so that they may be fitted closely together and a firm joint attained.

The particular formation of the joint is more clearly illustrated in Fig. 3 in which it will be noted that the upper edge of the lower ring or plate 6 projects above the lower edge of the upper ring or plate 7 so as to overlap the upper plate at the joint and consequently form a pocket between the plate and the angle iron in which cement may be poured. The cement will fill all the crevices around the members of the joint so that the joint will be air tight and air cannot pass through the same into the silo, nor can any leakage occur from the silo through the joint. In actual practice, it is usual to paint the inner surface of the silo, after it has been completed, with some acid-resisting paint, and the juices and sap contained in the material placed in the silo are thereby prevented from eating into the metal of which the several rings are composed.

In Fig. 4, I have shown a slight modification of the joint in which the upper and lower plates, indicated at 8 and 9, respectively, are arranged to form a butt joint, and the upper angle plate, indicated at 10, is of slightly less width than the lower angle plate 11 so that a pocket or space 12 will be formed between the upper angle plate and the rings to receive the cement for closing the joint. This joint may be preferred some times as it provides a smooth interior for the silo, but the joint shown in Fig. 3 permits a more rapid construction of the silo. When the joint shown in Fig. 4 is employed, the upper and lower angle plates will be bolted together at the factory and attached to the upper edge of the lower ring, while the lower edge of the upper ring will be left free and shipped in that condition.

In the joint shown in Fig. 5, the upper and lower rings 13, 14, are arranged to form a butt joint and the angle irons 15, 16, are arranged so that the joint between them is below the joint between the rings, the angle irons fitting close against the outer surfaces of the rings. In Fig. 6, the rings 17, 18, are arranged in a lap joint and the angle irons 19, 20, are secured directly against the outer faces of the respective rings. The upper angle iron, however, is spaced from the upper edge of the lower ring so that the lower edge of the upper ring may rest upon the lower angle iron.

With either form of joint, the customer may easily set up or build his silo by merely fitting one ring over the other and applying cement to the joints either before or after the superposed angle plates are secured together.

My improved silo is exceedingly simple and may be readily set up by unskilled persons and is constructed of metal, as this material is durable and readily lends itself to use in a knock-down structure.

While, in the foregoing description, particular mention is made of a silo, the joint will be found advantageous in all forms of storage tanks.

What I claim is:—

1. In a silo, the combination of superposed rings, an angle plate secured to the lower ring adjacent the upper edge thereof, an angle plate secured to the upper ring adjacent the lower edge thereof and resting on and secured directly to the first-mentioned angle plate, said upper angle plate being in spaced relation to the lower ring, and a plastic filling between opposed surfaces of the plates and rings.

2. In a silo, the combination of superposed metallic rings, angle plates secured to the rings adjacent the edges of the same and rigidly secured together, the edges of the rings overlapping in rear of the angle plates, and a cementitious filling between one of the rings and the angle plate secured thereto.

3. In a silo, the combination of superposed rings, the upper edge of the lower ring extending in rear of and above the lower edge of the upper ring, an angle plate secured to the lower ring below the upper edge of the same, an angle plate secured to the first-mentioned plate in spaced relation to the said ring to provide a pocket which receives the upper ring, said last-mentioned angle plate being secured to the upper ring, and a plastic filling arranged between the opposed surfaces of the plates and rings.

4. In a silo, the combination of superposed rings, angle plates secured to the rings adjacent the edges thereof and rigidly secured together with the upper plate resting directly on the lower plate, the joint between the rings being out of alinement with the joint between the plates, and a plastic filling between opposed surfaces of the plates and rings.

In testimony whereof I affix my signature in presence of two witnesses.

JOHN R. BOARDMAN. [L. S.]

Witnesses:
CARL F. WELHENER,
L. R. HUNT.

Copies of this patent may be obtained for five cents each, by addressing the "Commissioner of Patents, Washington, D. C."